US005719561A

United States Patent [19]

Gonzales

[11] Patent Number: 5,719,561
[45] Date of Patent: Feb. 17, 1998

[54] TACTILE COMMUNICATION DEVICE AND METHOD

[75] Inventor: Gilbert Rene Gonzales, Scottsdale, Ariz.

[73] Assignee: Gilbert R. Gonzales, Scottsdale, Ariz.

[21] Appl. No.: 548,003

[22] Filed: Oct. 25, 1995

[51] Int. Cl.$^6$ .................................................. H04Q 1/00
[52] U.S. Cl. ............................... 340/825.46; 340/825.19; 340/407.1
[58] Field of Search ..................... 340/825.19, 825.46, 340/407.1

[56] References Cited

U.S. PATENT DOCUMENTS

| | | |
|---|---|---|
| 3,229,387 | 1/1966 | Linvill . |
| 4,191,945 | 3/1980 | Hannen ............................. 340/407.1 |
| 4,307,266 | 12/1981 | Messina ........................... 340/825.46 |
| 4,379,697 | 4/1983 | Linvill . |
| 4,491,760 | 1/1985 | Linvill . |
| 4,871,992 | 10/1989 | Petersen .......................... 340/825.19 |
| 4,926,879 | 5/1990 | Sevrain ............................ 340/407.1 |
| 4,985,692 | 1/1991 | Breider ........................... 340/825.19 |
| 5,165,897 | 11/1992 | Johnson .......................... 340/825.19 |
| 5,580,251 | 12/1996 | Gilkes ............................ 340/407.1 |

OTHER PUBLICATIONS

The effects of complexity on the perception of vibrotactile patters, David T. Horner, *Perception & Psychophysics*, 1991, 49 (6), 551-562.

Perception of amplitude envelope variations of pulsatile elctrotactile stimula, P. J. Blamey et al, *J. Acoust. Soc. Am.*, vol. 88, No. 4, Oct. 1990.

Separating signal and noise in vibrotactile devices for the deaf, Barry L. Richardson, *British Journal of Audiology*, 1990. 24. 105-109.

Effect of Tactile Stimulation Pulse Characteristics on Sensation Threshold and Power Consumption, Enrico Nunziata, et al., Annals of Biomedical Engineering, vol. 17, pp. 423-435, 1989.

Evaluation of two multichannel tactile aids for the hearing impaired, Janet M. Weisenberger et al., J. Acoust. Soc. Am. 86(5), Nov. 1989.

Tactile memory in sighted and blind observers: the influence of orientation and rate of presentation, Morton A. Heller, Perception, 1989, vol. 18, pp. 121-133.

Immediate memory for haptically–examined braille symbols by blind and sighted adults: effects of item size, Slater E. Newman et al., International Journal of Rehabilitation Research 14, 261-264(1991).

Plasticity of the sensorimotor cortex representation of the reading finger in Braille Readers, Alvaro Pascual–Leone et al., Brain (1993), 116, 39-52.

The Cutaneous "Rabbit": A Perceptual Illusion, Frank A. Geldard et al., Science, vol. 171.

Apparent haptic movement, Carl E. Sherrick et al., Perception & Psychophysics, 1966, vol. 1.

The Art of Tactile Communication, Carl E. Sherrick, American Psychologist, Mar. 1975.

The Perception of Two Points is Not the Spatial Resolution Threshold, Kenneth O. Johnson et al., Touch, Temperature, and Pain in Health and Disease: Mechanisms and Assessments, Progress in Pain Research and Management, vol. 3.

Virtual All–Points–Addressable Tactile Display, vol. 31 No. 12 p. 135, May 1989.

*Primary Examiner*—Brian Zimmerman
*Attorney, Agent, or Firm*—Gregory F. Cotterell

[57] ABSTRACT

The present invention is for use in tactile communications adaptable by anyone able to recognize messages written in a language known to them. The present invention uses a series of sequentially firing vibromechanical stimulators vibrating against the skin or other suitably tactile sensitive area of the wearer. The vibromechanical stimulators are arranged in a substantially two dimensional array over the skin and are then triggered individually and in sequence, following a set of patterns representative of the symbols in the language recognizable to the wearer to tactually convey the message. The wearer cognitively perceives the tactual stimulation as a line or lines drawn on the skin or suitably tactile sensitive area that resemble the symbols used to communicate between the message sender and the wearer.

27 Claims, 5 Drawing Sheets

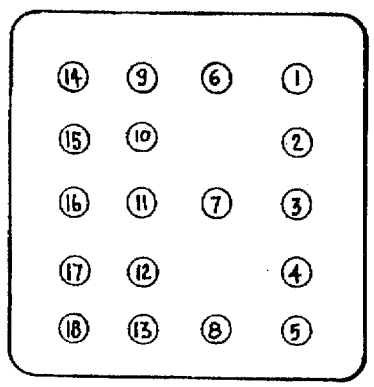
FIG. 8 (a)
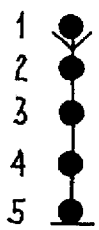
FIG. 8(b)
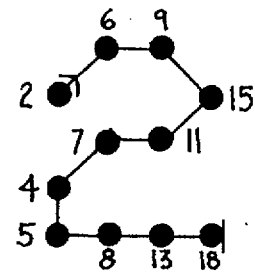
FIG. 8(C)
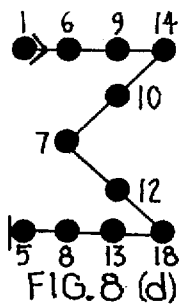
FIG. 8(d)
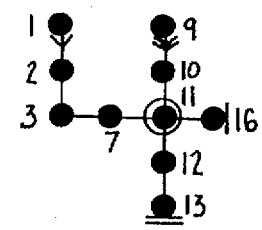
FIG. 8(e)
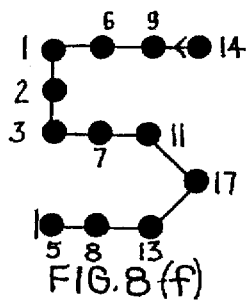
FIG. 8(f)
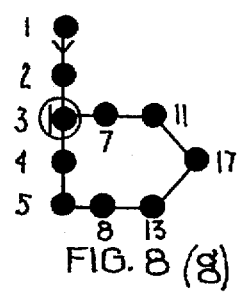
FIG. 8(g)
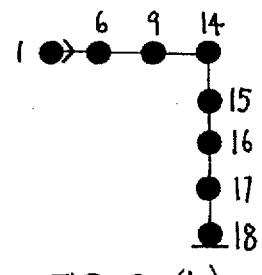
FIG. 8(h)
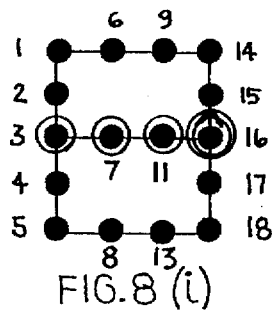
FIG. 8(i)
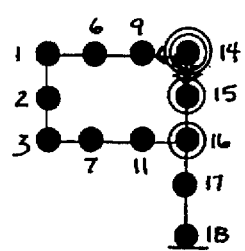
FIG. 8(j)
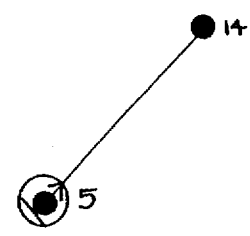
FIG. 8(k)
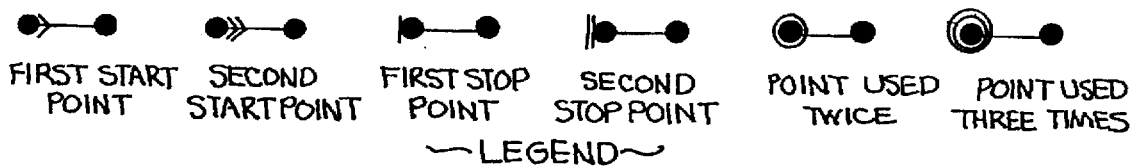
— LEGEND —

TACTILE COMMUNICATION DEVICE AND METHOD

FIELD OF THE INVENTION

The present invention relates to a communication device, in particular a tactile communication device, as a personal communication device for receiving messages.

BACKGROUND OF THE INVENTION

Communication methods and devices have traditionally relied on audiovisual modes to convey the message from a source to a recipient. Audiovisual modes are capable of conveying considerable amounts of information within a reasonable time period with acceptable accuracy. The primary audiovisual modes of communication have relied on the receiver's eyes and ears.

A lesser known and relatively uncommon mode of communication is tactile communication. As discussed below in more detail, efforts to develop this mode of communication have been limited and typically geared towards improving the communication reception for people disabled or impaired in either hearing or vision. Tactile communications has not found use in the general population essentially because of the overwhelming reliance on audiovisual modes of communication.

Development of communication devices using the sense of touch in general have suffered because of a general lack of knowledge in the area of understanding the sense of touch. There is also a relative lack of sophistication of the sense of touch when compared with the acuity found for the senses of hearing and vision. By comparison, the sense of touch exhibits difficulty with localization and perception of a stimulus. Humans are able to see extremely fine patterns of surface asperity that nonetheless feels as smooth as glass. The relatively low level of sophistication of the sense of touch remains somewhat baffling in light of the myriad types of end organ receptors that provide the brain with tactile information about our environment obtained through the sense of touch.

Within the human body, tactile conditions are monitored through an interaction of neuron end organ receptors within the skin and internal organs and musculoskeletal system of the human body. Stimulation of tactile end organs sends a stimulus along the neuron of that end organ to the sensory cortex of the human relaying the information typically carried by these nerves. There are a number of different types of end organ effectors within a human. The general areas of sensory modality detected by skin receptors fall in the categories of fine or light touch, coarse touch, vibratory, pressure, pain, heat, and cold. Mechanoreceptor end organs are present within the human body in muscles, tendons and joints and provide important information concerning musculoskeletal positioning and movement. Consequently, the sense of touch can be distinguished by dividing into two general categories, the first being the exteroceptive sensory modality and the second category is the proprioceptive sensory modality. The general subject of this present invention will be concerned primarily with the exteroceptive tactile sensory modality.

The neuron end organ effectors in the exteroceptive modality are a diverse assortment of organelles. There are free nerve endings, Merkel's discs, Meissner's corpuscles, Pacinian corpuscles, and Ruffini's endings supplying tactile sensation to the skin. Free nerve endings predominate and are found generally throughout the entire skin surface area. Free nerve endings typically innervate the layers of the skin as unmyelinated fibers carrying primarily pain as well as hot, cold and light touch. Free nerve endings with medium myelinated fibers are associated with hair follicles within the skin and predominantly supply light touch sensations.

Meissner's corpuscles are predominantly associated with the thicker skin of the palms and fingertips of a hand and the sole and toe tips of the feet and primarily provide the perception of light touch in these areas. The high density of Meissner's corpuscles in the hands and feet is the underlying anatomic basis behind the relatively exquisitely sensitive tactile abilities associated with the hands and feet and two point discrimination. In contrast, Meissner's corpuscles are rare elsewhere in the thinner skin of the human body. Contrast the decrease in Meissner's corpuscles with a relative increase in the number of hair follicles and associated free nerve ending fibers that provide the light touch sensory modality to those areas of skin not associated with the palms or soles of the body. Consequently, the differences in light touch between the palms, soles and the skin of the rest of the body lies not only in the difference in neuron end organ effectors but also in whether the nerve fiber is myelinated or non-myelinated. Merkel's corpuscles predominantly give rise to vibratory sensing ability. As a consequence, Merkel's corpuscles have less sensitivity to location and two point discrimination but exquisitely sensitive to spatial resolution of complex surface patterns when the fingers are scanned over an object or the object moved over the fingers.

The quality of sensory ability is dependent on the ability of an end organ effector (or free nerve ending) to sense the presence of a stimulus, respond to that stimulus by propagating a signal along the length of the neuron, recharge the neuron after its firing, and regain sensitivity to a stimulus following reception of the previous stimulus. These general areas of qualification of nerve function are threshold, conduction velocity, refraction, and adaptation. Non-myelinated fibers are generally slower to conduct, have higher periods of refractoriness and quickly adapt to external stimuli relative to myelinated fibers and the converse is true wherein the greater the degree of myelination the higher the conduction velocity, the shorter the period of refractoriness and the less susceptible to adaptation the nerve becomes. Additionally, the more sophisticated neuron end organs such as Pacinian corpuscle, Merkel's corpuscle, Meissner's corpuscle, and Ruffini's corpuscle generally share a higher degree of sophistication as to structure and are associated with medium myelinated fibers. Contrast this with heavily myelinated fibers used in the proprioceptive sensory modality where position sense, muscle force contraction and joint position are relatively refined and sophisticated allowing us to perform fairly complex fine motor athletic movement. The heavily myelinated fibers having the highest rate of conduction, the shortest period of refractoriness and the greatest resistance to adaptability.

Threshold of a nerve fiber will depend in great part to the type of neuron end organ effector present on that nerve fiber. The threshold of firing will also depend on the type of stimulus being presented to the neuron end organ. Free nerve endings along the basement membrane of the cutaneous layer of the skin have little, if any, end organ structure to them and have fairly low thresholds for firing. Free nerve endings are also found to be fairly diffuse with the free end organs branching a number of times and innervating a substantial area of skin in proportion to the size of the nerve fiber supplying that area. Consequently, the quality of signal received from free nerve endings has a generally diffuse character poorly localized when compared to light touch provided by a Meissner corpuscle. A Meissner corpuscle is arranged in a tiered fashion of epithelial cells within the corpuscle with the main axis of the corpuscle perpendicular to the surface of the skin. This tiered arrangement, much like a stack of pancakes where each pancake represents a specialized epithelial cell and a nerve ending between the pancakes, is oriented in such a way as to be very sensitive to slight pressures applied along its major axis and relatively insensitive to pressures arriving from a lateral direction. This directionality of a Meissner corpuscle contributes to its greater ability to finally localize and discriminate from two different points accurately. Contrast a Meissner corpuscle with a Pacinian corpuscle which essentially is a laminated body surrounding a single nerve ending. This lamellar construction with the nerve ending at its center provides increased sensibility to pressure from all directions but because of a lack of orientation there is less sensitivity to discriminate size and location of the pressure stimulus.

Conduction velocity is a measure of the speed with which a nerve will transmit to the sensory cortex of the brain the fact that a stimulus has arrived at the nerve end organ. Myelination provides for higher conduction velocities where more myelin is associated with faster conduction velocities.

When a nerve threshold is reached, the nerve rites and conducts a signal stimulus along its length and must then recharge the nerve in order to be ready to respond to the next stimulus. The length of time that the nerve is discharged is known as the refractory period. The refractory period is a state of non-responsiveness on the part of the nerve in that it cannot respond to a continuing external stimulus during this period.

Neuronal adaptation is that ability of the nerve to modify its level of sensitivity to changes in the environment. In effect, the neuron becomes used to the external stimulus and reestablishes a new level of response to stimuli.

Tactile communication not only relies on the ability to sense that a touch has in fact occurred but also determine the nature of the touch. The touch should convey useful information. An example might be placing a car key in the hands of a blindfolded subject. The subject should be able to tell you not only that their hand has in fact been touched but be able to discern from the pattern of the stimulus that you have placed a car key in their hand. This level of perception is defined as stereognosis which is the appreciation of a form of an object by means of touch. With the perception of a key, the subject is able to tactually feel a continuous surface and edge. In light of the anatomy and distribution of neuron end organs contributing to tactual perception, the spatial resolution is limited by the spacing of single nerve fibers in the immediately surrounding area adjacent to that single nerve fiber and its end organ. As in the case of the fingertip and the high density of Meissner's corpuscles, the perception of a spatial form on the skin of the fingertip would depend on a neuronal image of the stimulus established by the density of the Meissner corpuscles. The greater the density, the greater the perceptual ability to perceive complexity and the greater the spatial resolution. The effect of this density pattern of neuron end organs becomes readily apparent when considering a subject's ability to discriminate between two points. Our tactile ability to resolve a form spatially is enhanced if we then rub our fingers over the object, such as the key. This scanning motion sets up a vibratory sensation to which Merkel's corpuscles may respond. The vibratory sensation builds up an image that is resolvable at dimensions less than a millimeter.

In the article titled "The Perception of Two Points is not the Spatial Resolution Threshold", K. O. Johnson et al., in *Touch, Temperature, Pain and Health Diseases; Mechanisms and Assessment*, Progress and Pain Research and Management, Vol. 3, edited by J. Boivie et al., the authors discuss the tactual difference in perceiving a two point discrimination versus spatial pattern recognition thresholds. In their review, Johnson et al. discuss the responses evoked by one and two point stimuli versus the neural mechanisms associated with tactile spatial resolution. The results demonstrate that there is a distinctly different mechanism of response by a human subject when presented with a single probe, a double probe or a more complex vibratory pattern. Furthermore, they are able to show that response to one and two point stimuli will produce different sensations depending upon longitudinal or transverse orientations of the probes which would allow discrimination between one and two points stimuli on the basis of cues that may have had nothing to do with spatial resolution. Furthermore, they were able to demonstrate that the threshold of tactile spatial resolution has remained independent of the two point discrimination threshold. It has been shown that the neurologic system responsible for tactile spatial pattern recognition at the limits of resolution is the slowly adapting type 1 (SAI) afferent fiber system. The individual SAI afferent fibers terminate in Merkel receptors and have high spatial resolving capacity. Contrast this with rapidly adapting (RA) afferents which terminate in Meissner corpuscles and have poor spatial resolving properties. Meissner corpuscles have relatively high density in the fingertips and palms of the hand and toes and sole of the feet. As noted above, this high density provides for substantially increased two point discrimination resolution, i.e., the ability of a subject to determine whether they are being touched by a single or two separate probes simultaneously. Contrast this with a plurality of probes that are in a spatially configured pattern, for instance the letter "A", such that if all of the probes come into contact with the skin surface of a fingertip simultaneously, the question becomes will the subject be able to discern and resolve the spatial configuration of the multiple probes if the probes are spaced together less than the two point discrimination threshold or if the probes are spaced apart greater than the two point discrimination threshold.

To evaluate this question, consider a device known as the Optacon developed by Bliss and noted in the paper "Summary of Optacon Related Cutaneous Experiment". In the conference on cutaneous communication systems and devices, F. A. Geldard, editor of the *Psychonomic Society*, 1974. The Optacon uses an array of 144 probes in a 12×12 pattern. The array measures approximately one to one and one-half centimeters on each side. Consequently, the distance between one probe and its nearest partner is approximately one millimeter. The Optacon takes visual representation of a letter or number as its input and extends the appropriate number of probes from the surface of the array to spatially correspond to the letter or number being visualized. For example, the letter "A" may use upwards of thirty probes simultaneously contacting the skin of a subject's fingertip with each probe no greater than approximately one millimeter from its nearest neighbor. Therefore, if the two point discrimination threshold is two millimeters, all thirty of the protruding probes from the array will be indistinguishable from each other and perceived as a single probe fairly broad in its size.

As demonstrated and discussed above, Meissner corpuscles are predominantly responsible for two point discrimination. Merkel discs, by contrast, are responsible for spatial resolution. However, to take advantage of Merkel's disc stimulation, the Optacon and similar devices such as U.S. Pat. No. 3,229,387 issued Jan. 18, 1966 to Linvill, use a plurality of probes in a fairly large array such as the 12×12 array of the Optacon. The array is used to scan across a page of letters and numbers while attached to a fingertip surface and the letters and numbers through protruding vibrating probes are then felt to scan across the fingertip much as a ticker tape output scans across a marquee. For example, the Optacon slides across the letter "A" and the letter "A" is felt to slide across the fingertip of the wearer of the Optacon. Sequential numbers of probes in the pattern "A" protrude from the surface of the array and vibrate at a set frequency. Depending upon the size of the letter there may be upwards of thirty or forty probes simultaneously vibrating against the surface of the subject's fingertip. It is the combination of the changing sequence of simultaneously vibrating probes and the vibration of the probes that contributes to the subject perceptually identifying the spatial resolution of the letter. If the letter were to not scan but remain static with the thirty or so probes arranged in a letter but vibrating against the subject's fingertip, the subject would not resolve the pattern into any useful recognizable alphanumeric. And as noted above, it has been shown that the SAI fibers terminating in Merkel's discs contribute to the spatial resolution perceived by a subject using a device similar to the Optacon.

Tactile stimulators may be generally divided into two groups: The synthetic systems and the analogic systems. These systems are devices in which the cutaneous sensory system is intended to replace one of the other sensory systems, most commonly vision or hearing. Examples of analogic audio systems are cochlear implants that convert sounds such as speech into tactile sensations felt by a subject at a site designed to be used by the device. The ability to transmit speech to the skin using a single vibrating transducer generally has failed in attempts. Continued work in this area has led to the development of systems which electrically divide the speech spectrum into different frequency bands. These various bands may also be modified in terms of time delay schemes and positioning to more closely accommodate the direction of the actual sound source.

Other audio tactile aids are known as vocoders. A number of vocoder devices have been tested and an evaluation of two multichannel tactile aids can be found in the paper "Evaluation of Two Multichannel Tactile Aids for the Hearing Impaired", Weisenberger et al. in the *Journal of Acoustical Society of America*, Vol. 86 (5), pp. 1764–1775, November 1989. The two vocoder devices described used 16 element linear vibratory arrays displaying activity in 16 overlapping frequency channels. The 16 elements vibrated simultaneously with the frequency ranges approximately a third of an octave in bandwidth spaced evening over the frequency range between 140 to 6,350 Hz. Accuracy of communicating with these vocoders was limited with subjects being able to identify only 70% of a 250 word test list even when combined with lipreading.

All of these analogic systems replacing hearing use multiple vibrotactile probes vibrating simultaneously at frequencies approximating those of actual speech. These systems have proven difficult to incorporate and accurately rely on.

Visual analogic systems are represented by such devices as the Optacon or a tactile vision information system (TVIS) as described in "Effective Tactile Stimulation Pulse Characteristics on Sensation Threshold and Power Consumption", Nuziata et al., *Annals of Biomedical Engineering*, Vol. 17, pp. 423–35, 1989. The authors describe the basic function of the TVIS as the acquisition of an optical image with a video camera and the transformation of the image or some portion of the image into a vibratory pattern on a specific region of skin. Like the Optacon, the TVIS uses a vibratory tactile array coupled with appropriate electronic frequency filtering in order to create a spatial analog of the visual scene being picked up by the video camera. Each vibrator used a base frequency of 250 Hz. The choice of 250 Hz was dependent on the minimum threshold for tactile sensation using Pacinian corpuscles that are the most responsive end organ receptors in the vicinity of 250 Hz stimulation frequencies. Both the Optacon and the TVIS use multiple vibrating probes in a spatial pattern to create the vibrotactile message discerned by the subject using the device.

While an analogic system such as the Optacon, where the device uses multiple simultaneous vibrotactile probes to create a complex spatial form, confusion and difficulty with perception has been studied. In the paper "The Effects of Complexity on the Perception of Vibrotactile Patterns", Horner, *Perception and Psychophysics*, line 49 (6), pp. 51–62, 1991, the author identified tactile confusion for letters with a greater number of lines such as the letters M, W, B and K. Therefore, despite the spatial threshold being significantly less than the two point discrimination threshold, the difference of 0.9 millimeters versus approximately two millimeters for the overlaying skin of a fingertip, complexity of the spatial form remains an obstacle difficult to overcome.

Synthetic systems employ communicating with languages employing synthetic codes. Braille is the most useful, best known and longest lived example of the synthetic families of tactile codes. Braille uses a 2×3 array to form unique patterns discernible as the alphabet. Consequently, the tactile experience does not resemble either the visual or auditory experience associated with the letter for which the pattern stands. In the simplest of terms, synthetic systems require that the user of the system learn the additional language set employed by the synthetic system.

Translation of Braille into a vibrotactile device would necessarily require an array 2×3 and be capable of simultaneously vibrating up to all six of the probes. As with the Optacon, to achieve the smaller sizes and utilize the lower threshold associated with spatial resolution of complex forms, the Braille patterns would necessarily need to be scanned across the skin surface, preferably the tip of a finger. Consequently, a device useful for tactually displaying Braille figures would need an array having substantially greater than six vibromechanical probes. Without the scanning capability, a device incorporating Braille as the underlying interpretive language would use a minimum of six vibromechanical probes, each requiring spacing between probes to be greater than the two point discrimination threshold. This minimum spacing is necessary to allow the subject wearing the device to discern between two or more probes, since Braille characters require anywhere from one to six simultaneously vibrating probes.

The communication systems described above have been developed as devices to provide communication devices to subjects who are otherwise impaired with either visual or auditory abilities to communicate. Whether synthetic or analogic, these systems generally rely on Merkel's discs densely populating the fingertips to achieve spatial resolution thresholds low enough to communicate complex spatial forms such as letters and numbers.

There exist other tactile phenomena that are not well understood. An example of such a tactile phenomenon is described in the paper "Apparent Haptic Movement" by Sherrick et al. in *Perceptions and Psychophysics*, Vol. 1, pp. 175–180, 1966, wherein the author describes the induction of a sense of movement produced by stationary vibrators sequentially fired over the surface of the subject's body. The authors describe one example where an intense sense of rotational motion was induced by successively firing six vibrators placed around a subject's chest. The authors further studied a subject's sensation of haptokinetic movement employing a device with two vibrators spaced at different distances from 4 to 22 centimeters along the length of the subject's leg. The subject was allowed to control the duration of the two vibrotactile bursts as well as the interval of time between the onset of the two vibrotactile bursts. In this way, the subject was able to adjust the sequential firing of the two vibrators to achieve a maximum perception of haptic movement between the two vibrators. For each trial run, the vibrators were vibrated at 150 Hz for burst durations ranging from 25 to 400 milliseconds (msec) which equates to from 4 to 60 vibrations per burst. The interval between burst onsets ranged from 75 to 400 msec.

A different tactile phenomenon was induced in subjects using a system slightly different than the previously described system as outlined in the journal article "The Cutaneous 'Rabbit': A Perceptual Illusion" by Geldard et al. in *Science*, Vol. 176, pp. 178–179, Oct. 13, 1972. These authors used from two to five vibrators consisting of a short length of lucite rod about 0.6 centimeters in diameter with a rounded tip rigidly mounted on Clevite bimorph benders and driven by a pulse generator generating a square wave pulse 2 msec in duration. Each vibrator received five pulses separated anywhere from 40 to 80 msec between each pulse. The vibrators were aligned in a linear array over a subject's forearm and upper arm on an average spacing of approximately ten centimeters with a range from two centimeters to 35 centimeters. The phenomenon experienced by the subjects in the test was the sensation of a smooth progression of jumps, or taps, on the arm between the successively firing vibrators. It was described as if a tiny rabbit were hopping from one vibrator to the next. If the number of vibrator taps is increased for each vibrator then the hops become shorter and closer together and the opposite effect is also noted. The authors distinguished this rabbit effect from the vibrotactile movement described above by Sherrick et al. on the basis that the rabbit effect gives a discontinuous hopping sensation described as discreet taps between the stimulus loci which is in contradistinction to the continuous vibrating gouging sensation in the skin between loci experiencing the vibrotactile or haptokinetic movement illusion.

The devices that attempt to replace vision or hearing do so by relying on a plurality of vibrators firing simultaneously to reproduce either a complex spatial arrangement such as a letter or number or to recreate the vibrations associated with speech. These systems consume a considerable amount of power to fire the plurality of vibrator arrays simultaneously and are dependent on their interaction with Merkel's discs, Meissner's corpuscles or Pacinian corpuscles to relay the communication information from the vibromechanical device to the conscious awareness of the recipient.

The perceptual phenomena described with the vibrotactile or haptokinetic movement and the rabbit affect appear to be independent of Meissner's corpuscles, Merkel's discs or Pacinian corpuscles since the vibromechanical stimulators are placed independent of, and in fact can be varied in their distance between each locus and still create the illusion of movement between the stimulator loci. These phenomena appear to be more a function of perception at the sensory cortex level as the stimuli are reconstructed in real time and perceived at a conscious awareness level by the subject. Therefore, these phenomena appear to be independent of two point discrimination and spatial resolution thresholds.

There does not as yet exist a vibromechanical tactile communication device capable of universal use that can receive and convey information to the wearer conveniently or accurately.

SUMMARY OF THE INVENTION

The present invention discloses a method and device for vibromechanical tactile communications adaptable for use by anyone able to recognize alphanumeric messages in a language or in other symbols known to them. The present invention uses a series of sequentially firing vibromechanical stimulators vibrating against a suitably tactile sensitive surface of the wearer, such as skin or buccal mucosa, to induce a phenomenon of illusion of linear continuity. This illusion of linear continuity, through vibromechanical stimulators tapping on the suitably tactile sensitive surface of the wearer, can be used to produce simple or complex pattern configurations perceived cognitively by the wearer of the device as line drawings, such as alphanumerics or other symbols recognizable by the wearer. Although the wearer is receiving discrete tappings on the surface area, the patterned vibratory stimuli are consciously perceived as the uninterrupted dragging of a blunt tipped stylet across the subject's skin. The closest somatosensory equivalent to this phenomenon is the tactile and cognitive sensation known as graphesthesia. In the present invention the electromechanical vibrators are arranged in an array. Each vibrator in the array is spaced apart from its nearest neighbors a distance still within the two point discrimination threshold distance for the suitably tactile sensitive surface area being stimulated. Each vibromechanical stimulator is triggered to vibrate individually and sequentially from one stimulator to the next successive stimulator for the pattern chosen to be conveyed in the message.

An embodiment of the present invention is a tactile communications device for use by a human wearing the device against the skin of the human and receiving and converting a communications data stream into a message haptically or cognitively perceptible to the human. The device comprises a housing including an electrical power source, a tactile stimulator array mountable within the housing and having a plurality of vibromechanical stimulators positionable in a substantially two dimensional array, the array being abuttably positionable over a suitable tactile sensitive surface area of the human and the plurality of vibromechanical stimulators being electrically connected to the electrical power source, a control circuit electrically connected to the electrical power source and the tactile stimulator array for independently and sequentially controlling each vibratory stimulator, the control circuit including a communications receiver for electronically receiving a digital alphanumeric and other symbol communications data stream, an analog pattern storage circuit for storing a patterned sequence of turning on and off at least one vibratory stimulator of the plurality of vibromechanical stimulators corresponding to each alphanumeric and symbol stored, and a conversion circuit for converting the received digital alphanumeric and other symbol communications data stream into an analog data stream according to the corresponding analog pattern such that for each alphanumeric and symbol datum within the analog data stream, beginning with the first datum, the corresponding analog pattern is used to turn on and off a sequence of vibromechanical stimulators, one vibratory stimulator at a time, following the pattern sequence for each alphanumeric datum converted from the digital data stream.

The present invention embodies a tactile communications method for receiving and converting a communications data stream into a message haptically perceptible to a human, the method comprising the steps of attaching a housing to the human, the housing including an electrical power source, mounting a tactile stimulator array within the attachment housing, the stimulator array having a plurality of vibromechanical stimulators in a substantially two dimensional array, positioning the tactile stimulator array abuttably over a surface area of the skin of the human, connecting the plurality of vibromechanical stimulators electrically to the electrical power source, storing an analog pattern for each alphanumeric and other symbol, controlling each vibratory stimulator independently and sequentially using the stored analog pattern for each symbol, receiving electronically a digital alphanumeric and other symbol data stream, converting the received digital data stream into an analog data stream according to the corresponding stored analog patterns, turning on and off a sequence of vibromechanical stimulators, one vibratory stimulator at a time, according to the corresponding stored analog pattern for each alphanumeric datum within the analog data stream, beginning with the first alphanumeric datum such that the sequence of vibrating stimulators on the skin is perceived tactually by the human as the communications message, and controlling the sequence of vibratory stimulator on and off times and intervibratory latency time periods such that the illusion of linear continuity phenomenon and the complete or whole alphanumeric and other symbol message is cognitively experienced after the entire sequence for the alphanumeric is given.

It is an object of the present invention to provide a method and device for tactile communications useful for persons who are sighted and have hearing as well as for persons blind and or deaf. The device of the present invention is anticipated to accurately convey a message to the wearer of the device even while the wearer is engaged in other activity, such as driving or flying.

It is an additional object of the present invention to provide a method and device capable of accurate and timely tactile communications in many, if not all, the known written languages as well as in complex symbols and codes mutually known between the sender of the message and the wearer of the device.

The above and other objects and advantages of the present invention will become more readily apparent when reference is made to the following description, taken in conjunction with the accompanying drawings, and are in no way intended to limit the scope of the present invention.

BRIEF DESCRIPTION OF THE DRAWINGS

FIGS. 8a through 8k are representative examples of how an embodiment of the present invention functions to generate tactile communications.

DETAILED DESCRIPTION OF THE INVENTION

Figure 1:
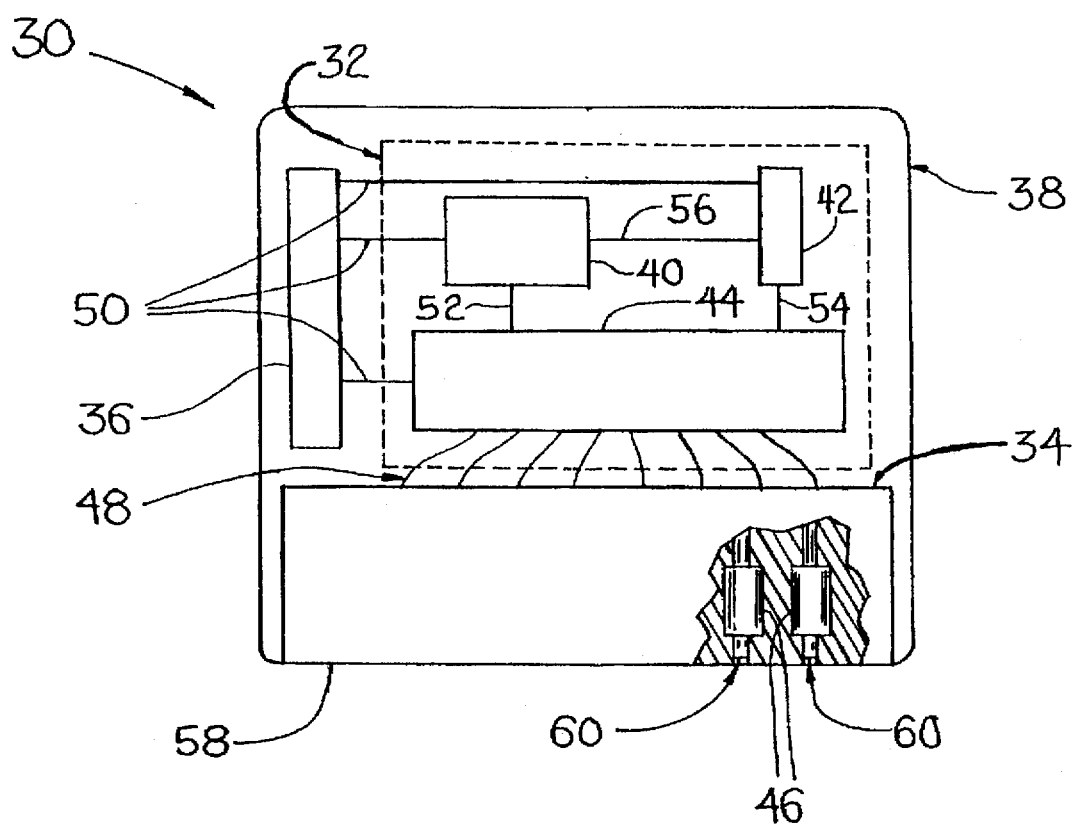
FIG. 1 is a side elevational view of an embodiment of the present invention with the outer housing depicted in phantom for better clarity, the electronic components in block diagram and the array component partially sectioned for clarity.

FIG. 1 depicts an embodiment of the present invention as a tactile communication device 30 which includes a control module 32, a stimulator array 34, a power source 36, and a housing 38. Tactile communication device 30 is an electromechanical device capable of receiving messages from an internal source transmitted to tactile communication device 30 from a remote device and then delivering the message to the user of tactile communication device 30 as a tactually sensed and cognitively perceived message.

Control module 32 includes a data receiver 40, a pattern memory module 42 and a conversion module 44. Data receiver 40 comprises an electronic data reception capability preferably as radio frequency electronic communications. As a receiver, data receiver 40 will receive messages in the form of a data stream. The data stream itself may include analog, digital or combinations of these forms or other forms. Data receiver 40 is electronically connected to pattern memory module 42 via a memory data transfer bus 54. Data receiver 40 is also electronically connected to conversion module 44 through a message data transfer bus 52. Pattern memory module 42 is electronically connected to conversion module 44 through a memory data transfer bus 54. Data receiver 40 is electronically connected to pattern memory module 42 through a memory rewrite transfer bus 56.

Power source 36 delivers electrical energy through electrical connectors 50. As depicted, power to stimulator array 34 is received through a plurality of electrical connections 48 between control module 32 and stimulator array 34.

Simulator array 34 includes a plurality of vibromechanical stimulators such as an array of electrical solenoids 46. Suitable alternative vibromechanical stimulators are available such as bimorph ceramics and piezoelectric materials. Stimulator array 34 is constructed to present a two dimensional array of vibromechanical stimulators across a housing face 58 having corresponding housing face apertures 60 through which each vibromechanical stimulator may protrude and retract a tactile effector portion of each vibromechanical stimulator.

Figure 2:
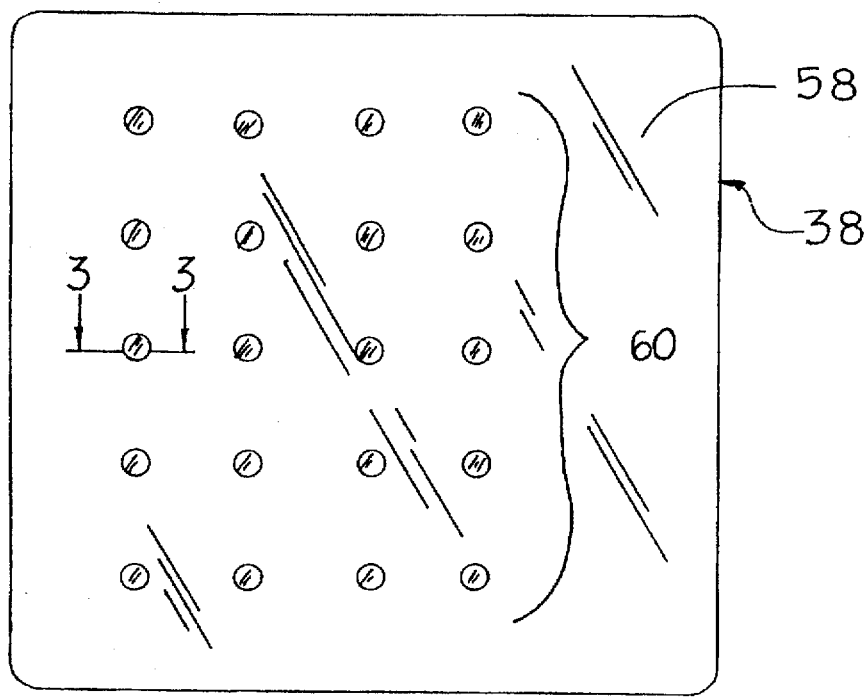
FIG. 2 is a bottom plan view of the housing of the embodiment depicted in FIG. 1.

One embodiment of the two dimensional array of housing face apertures 60 in housing face 58 is depicted in FIG. 2. There are depicted eighteen housing face apertures 60 arranged in three columns of five and a single column of three housing face apertures 60.

Figure 3:
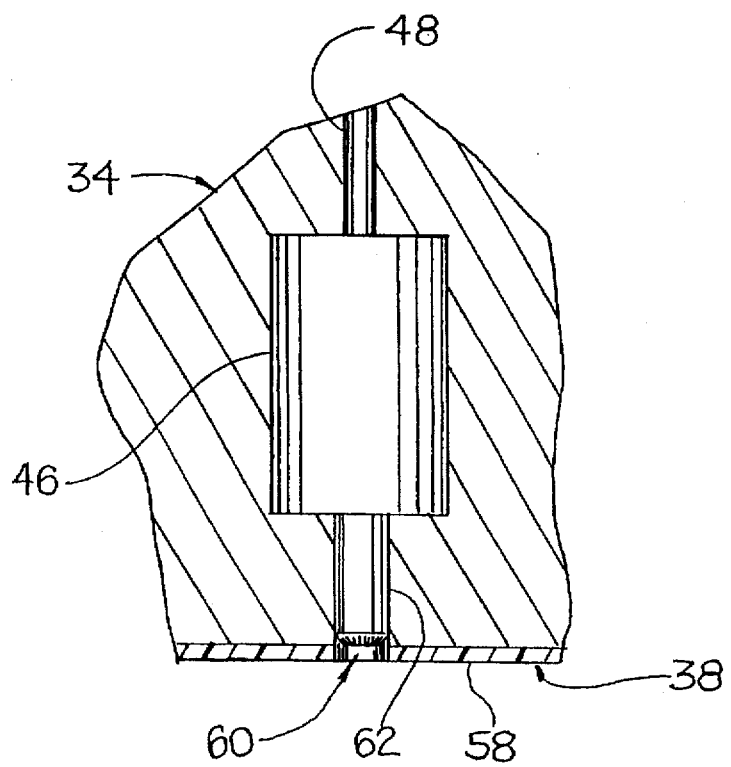
FIG. 3 is a cross-sectional view taken at the line 3—3 in FIG. 2.

FIG. 3 depicts an example of a vibromechanical stimulator with a tactile effector portion as a solenoid 46 with its electrical connection 48 and a solenoid piston 62. As shown, solenoid piston 62 acting as a tactile effector is in a retracted position and upon energizing solenoid 46, solenoid piston 62 will be forced out aperture 60 through housing face 58.

Figure 4:
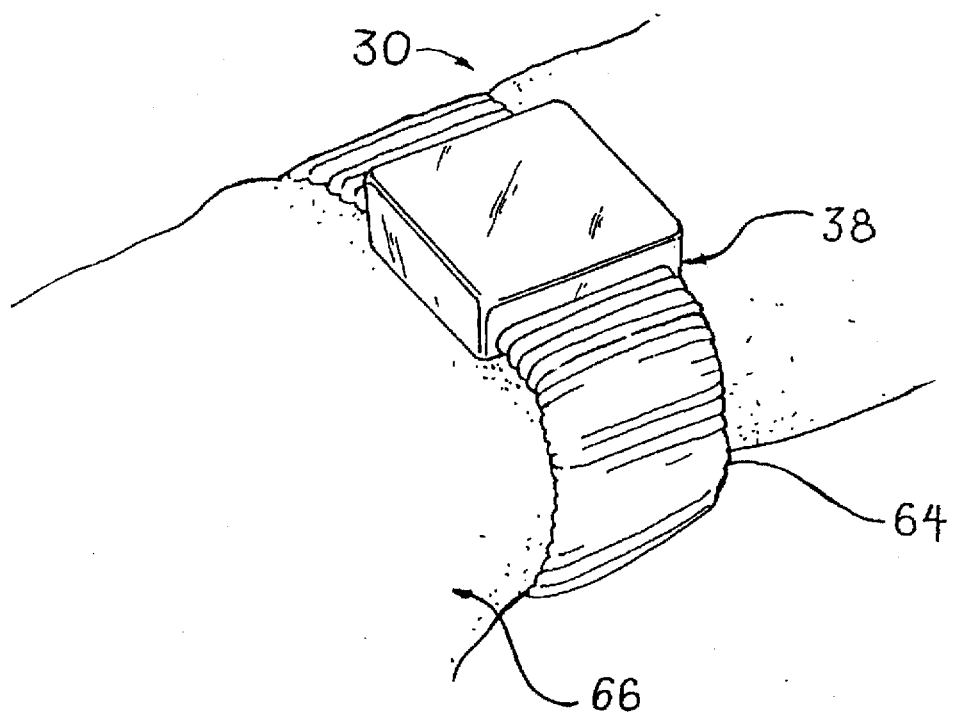
FIG. 4 is a perspective view of the embodiment of FIG. 1 as an embodiment of the invention to be worn on a wearer's skin.
Figure 5:
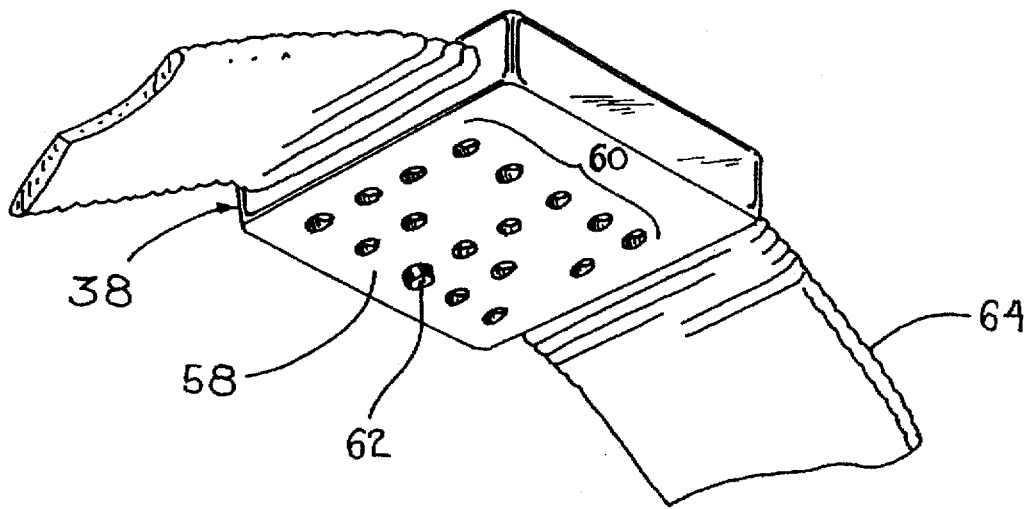
FIG. 5 is an additional perspective view of the embodiment of FIG. 1.

Tactile communication device 30 is depicted in FIG. 4 using a band 64 to attach housing 38 to the skin of a wearer such as a forearm 66 much like wearing a watch. As depicted, the orientation is to place housing face 58 against the surface of the wearer's skin. In this orientation, the vibromechanical stimulators will come into contact with the surface of the wearer's skin when the stimulators are energized. An example is depicted in FIG. 5 where one of the solenoid pistons 62 projects through its corresponding housing face aperture 60 and extends beyond the boundary of housing face 58 surface. As worn against a wearer's skin or other suitably tactile sensitive surface, projection of any of the solenoid pistons 62 impinge against the wearer's skin and convey a tactual stimulation to the wearer.

Figure 6:
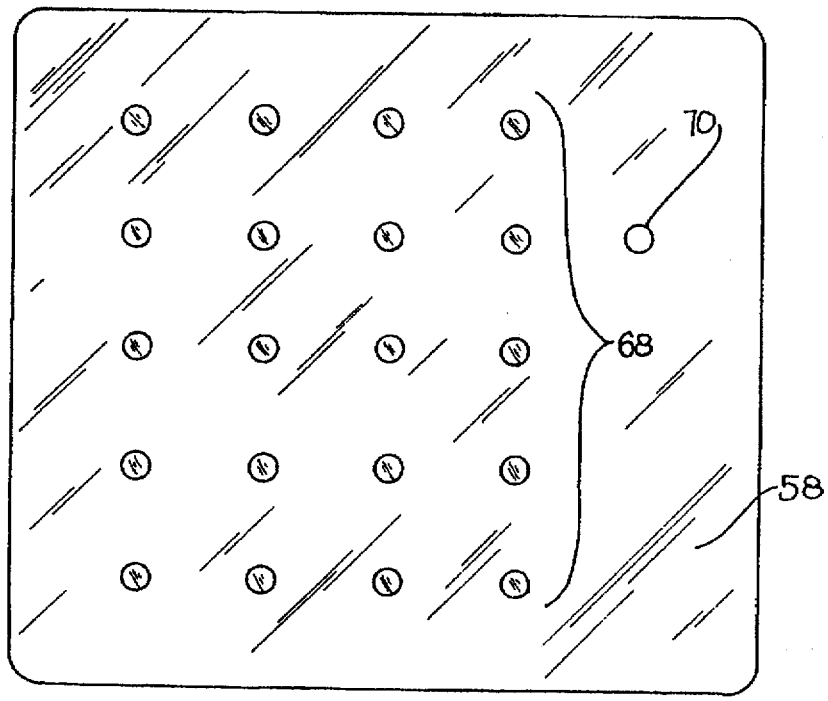
FIG. 6 is a bottom plan view of an additional embodiment of the present invention.
Figure 7:
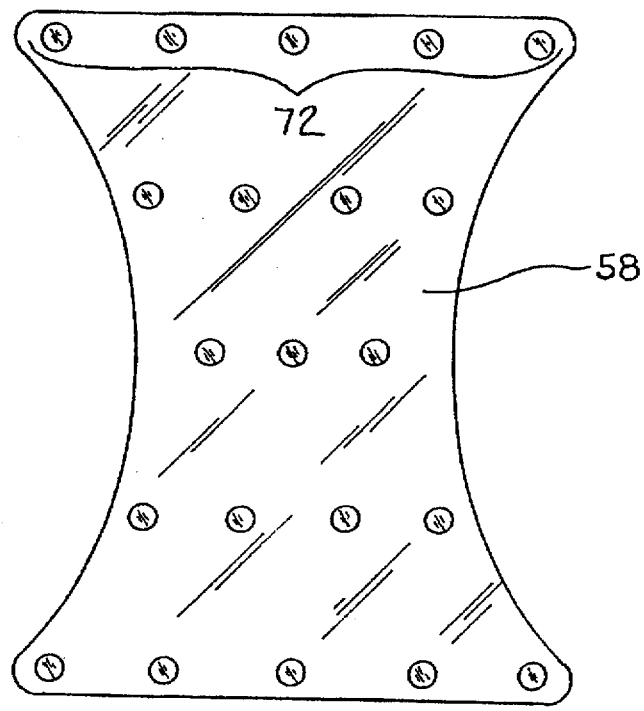
FIG. 7 is a bottom plan view of another additional embodiment of the present invention.

FIGS. 6 and 7 represent two additional embodiments of many possible embodiments for number and the two dimensional positioning of housing face apertures. The present invention anticipates that many different two dimensional arrays are available both in spatial orientation and in total numbers of vibromechanical stimulators used. For example, as depicted in FIG. 6, there are twenty-one housing face apertures with twenty in a housing face aperture array 68 that is four columns of five apertures. There is an additional aperture 70 placed to the side of aperture array 68 as an asymmetric configuration providing this embodiment with an aperture array capable of employing the asymmetric aperture 70 within the complete array or alternatively using aperture 70 and its corresponding vibromechanical stimulator to provide an asymmetric stimulus that may carry additional meaning. An example might be triggering the vibromechanical stimulator through aperture 70 to indicate that the tactile communication device is about to begin a message transmission, or switch from alphabet to numeric or even possibly denote when the next character to be delivered is a known complex pattern alerting the wearer to pay a heightened level of attention to the next character so as to discern its true nature. Further use of an asymmetric aperture such as aperture 70 will be discussed below.

FIG. 7 depicts an embodiment using twenty-one apertures in a housing face aperture array 72 having the shape of an hourglass in its two dimensional configuration. This particular arrangement depicted by aperture array 72 was arrived at through studies to determine the most efficient two dimensional array pattern for being able to trace all the letters of the English alphabet and the complement of arabic numerals as discussed below. Depiction of these three aperture arrays in no way should be construed as a limitation in the actual number of useful two dimensional arrays available to the present invention. Although not disclosed, additional two dimensional patterns have been studied and useful arrays have been constructed from patterns employing as few as nine vibromechanical stimulators to as many as thirty. Arrays utilizing from fifteen to twenty-three vibromechanical stimulators have demonstrated the greatest practicality in terms of highest efficiency at the lowest cost and still providing accurate rendition of the received message.

In operation, tactile communication device 30 is powered by an internal power source 36 preferably a power source capable of delivering intermittent high peak current suitable for energizing the vibromechanical stimulators chosen and additionally providing sustained low current power suitable for radio receivers and integrated circuits both digital and analogic.

Data receiver 40 comprises an appropriate radio receiver including an antenna for reception of a radio signal bearing the message to be communicated to the wearer of the device. The message may be in the form of digital or analog data streams and data receiver 40 will be set up accordingly. An additional mode of operation for data receiver 40 is reception of commands for both altering programs as well as the symbol patterns that are stored in pattern memory module 42. The preferable and most common patterns stored will be those consisting of the alphabet from A to Z and the set of arabic numerals. The symbol pattern is stored in pattern memory module 42 so that the appropriate symbol matching the symbol sent in the data stream to the data receiver 40 may be sent by pattern module 42 over memory data transfer bus 54 to conversion module 44. The present invention anticipates that other symbol sets may be utilized by the present invention, for example, coded symbol sets where an encryption and de-encryption scheme is shared between the source of the encoded message and the wearer of the device, the cyrillic alphabet, the Greek alphabet and even, but not limited to, Chinese and Japanese characters. Stored with each symbol will be the digital or analogic equivalent set forth as the message is received by data receiver 40. The data stream is then conveyed to conversion module 44 over the received data transfer bus 52 and the appropriate symbol pattern is then conveyed over memory data transfer bus 54. Conversion module 44 then compares the digital or analogic data stream to the digital or analogic equivalent of patterns representing each of the symbols received from pattern memory module 42.

Conversion module 44, using the appropriate pattern for the digital or analogic data received, sequentially fires a sequence of vibromechanical stimulators, firing one and then the next individually, until the alphanumeric pattern and/or symbol has been traced over the suitably tactile sensitive area of the wearer. As shown in FIG. 1, conversion module 44 uses solenoid electrical connections 48 to energize the plurality of solenoids 46 used in stimulator array 34. An example of a sequential firing of these solenoids 46 for tracing the Arabic numerals zero through nine is depicted in FIGS. 8, a through k. The particular sequence of sequential firing of vibromechanical stimulators depicted in FIG. 8 is not the only sequence of patterns available to the present invention. The present invention anticipates many different firing sequences for creating patterns for any of the alphabet, number or symbols available to any of the written languages. The present invention also anticipates the use of artificial languages and codes that may be used to communicate with the use of the present invention.

As depicted in FIG. 8(a), each element in housing face aperture array 60 in housing face 58 has been sequentially numbered from one to eighteen. As used, tactile communication device 30 is inverted over the skin of a wearer such that the pattern traced on the skin will be normal to the person's perception but will be necessarily inverted if one were to look directly at aperture array 60. FIG. 8(b) depicts one of the possible sequences for generating the number "1" by sequentially firing the vibromechanical stimulators associated with apertures labelled 1, 2, 3, 4 and 5. The pattern that is traced begins with firing the vibromechanical stimulator associated with aperture 1 individually and then sequentially followed by vibromechanical stimulator at aperture number 2, then at 3, then at 4, and finishing at 5. In FIG. 8(c), the number "2" is traceable using the following firing sequence of 2, 6, 9, 15, 11, 7, 4, 5, 8, 13, and ending with aperture 18. The number "3" has the firing sequence shown in FIG. 8(d) of 1, 6, 9, 14, 10, 7, 12, 18, 13, 8 and 5. The numbers "5", "6" and "7" as depicted in FIG. 8(f), (g) and (h), continue the linear sequential firing of vibromechanical stimulators through those apertures as shown in each of these three figures.

Numbers such as "4", "8" and "9" are depicted in FIGS. 8(e), 8(i) and 8(j), and involve more complex pattern. For example, the number "4" in FIG. 8(e) uses sequential firing of two linear pattern. The first sequential firing begins with 1 and continues with 2, 3, 7, 11 and ends with 16. The number "4" pattern is then completed with the second sequence firing beginning with 9, then 10, 11, 12, and ending with 13. Note that the vibromechanical stimulator associated with aperture 11 is used at two different times during the pattern tracing.

FIG. 8(*i*) depicts a firing sequence useful for the number "8" beginning with aperture 16, then going through the sequence 15, 14, 9, 6, 1, 2, 3, 7, 11 and returning to 16. Firing 16 a third time, the sequence then continues through 17, 18, 13, 8, 5, 4, 3, 7, 11, and finally back to 16. As is seen, the vibromechanical stimulator at aperture 16 has been used three times and the three stimulators at apertures 3, 7 and 11 were used twice.

The pattern trace for the number "9" as shown in FIG. 8(*j*) begins at aperture 14 and progresses through apertures 9, 6, 1, 2, 3, 7, 11, 16, 15, and then 14 again. 14 then fires again after its slight delay and the sequence finishes through 15, 16, 17, ending at 18. The number "9" might just as easily have been generated in a linear fashion, for example by inverting the "6" pattern in FIG. 8(*g*). The pattern in FIG. 8(*j*) was chosen, as were the patterns for "4" and "8" in FIGS. 8(*e*) and 8(*i*), because these patterns more closely approximate how these numbers are actually written. Recognition and accuracy have been shown to improve when construction of the patterns can follow the actual tracings one might use to create the numbers on paper.

As should be understood, the present invention is not necessarily limited to such a strict representation. An example of a useful alternative pattern may be found in FIG. 8(*k*) where only two vibromechanical stimulators are employed to convey the number zero as depicted in FIG. 8(*k*). The number zero is traced by beginning with the vibromechanical stimulator at aperture 5, then jumping to 14 and then firing number 5 for a second time. It is understood that the wearer of the tactile communication device would necessarily need to know that this particular pattern represented the number zero. One obvious alternative is to program a stimulator sequence firing sufficient to draw out a zero.

As noted above, the illusion of linear continuity of the present invention wherein letters, numbers and other complex symbols are cognitively recognizable from tactile patterns generated by a two dimensional array of vibromechanical stimulators is accomplished by spacing the vibromechanical stimulators within the two point discrimination threshold for the tactile sensitive area to be stimulated and using the vibromechanical stimulators one stimulator at a time in sequence. If two or more stimulators are used simultaneously, the illusion of linear continuity would not be created because the two or more simultaneously firing vibromechanical stimulators would not be perceived as individual or discrete vibromechanical stimulators but as a single point. The present invention does not use a scanning technique of firing multiple vibromechanical stimulators to scan a letter, number or complex pattern across the tactile sensitive area and therefore spatial resolution of a letter, number or complex symbol is not needed with the present invention. A number of vibromechanical stimulators are available to those skilled in the art and include solenoids, bimorph ceramics and piezoelectric crystals and ceramics.

In a number of studies using solenoids as the vibromechanical stimulators, several variables were determined to be influential in creating the illusion of linear continuity and a wearer's ability to cognitively recognize letters, numbers and complex symbols. These variable parameters were: the total number of vibrations for each solenoid used to generate a character, the delay time between a solenoid firing and the next solenoid to fire, the duty time for the solenoid, and the delay time between the end of creating of one character to the beginning of the creation of the next character. Appropriate electronic circuits for generating and delivering electrical pulses to solenoids were developed and are familiar to those skilled in the art. Components used include a suitable power source, a receiver, a pulse generator, a set of patterns programmed within a memory buffer and a control circuit for comparing the received message components with the pattern set in memory and generating a sequence of pulses deliverable to the appropriate sequence of solenoids to tactually convey the pattern of the message. Electronic circuits capable of modifying the above parameters were chosen.

Studies using a device for conveying arabic numeral was used to determine a useful range of values for the variable parameters discussed above. The range of total number of vibrations per solenoid was from two to fifteen vibrations with five as the preferred number of vibrations. The solenoid duty time was tested having two variables and using a square wave pulse: the actual solenoid on time in milliseconds and the solenoid off time in milliseconds. A useful range for solenoid on time was from two to twenty milliseconds. A useful range for solenoid off time was from two to ten milliseconds. The preferred solenoid duty time was fifty percent with a solenoid on time of ten milliseconds and a solenoid off time of ten milliseconds. Therefore the entire solenoid duty cycle time is preferably twenty milliseconds with a range from four to thirty milliseconds. This equates to a vibration frequency range of from 33 Hz to 250 Hz with a preferable frequency of 50 Hz.

The character delay setting is that programmable period between completion of the sequence for one letter, number or complex symbol to the onset of inscribing the next letter, number or complex symbol. Studies have shown this range to be substantially broad with a delay period as short as ten msecs to greater than three seconds. There does not appear to be any physical limitation to this delay. Rather, a cognitive perception of a character becomes the functional limitation. The subject should be able to discern the character being inscribed at a cognitive level prior to the onset of the next character to be delivered. The parameter reduces to the functionability of the subject to cognitively understand what is being delivered tactually before receiving the next character. This character delay setting becomes a functional speed setting for the subject wearer and generally determines how fast a message will be delivered to the subject. This control parameter is therefore subject to individual preference. The wearer should be able to control the speed with which a message is delivered.

As discussed above, for FIG. 6, aperture 70 with its associated vibromechanical stimulator was initially described as an asymmetrically placed aperture for anticipated purposes of prompting that a condition previous may change. Use of a prompter vibromechanical stimulator was useful in studies in order to assist some subjects having difficulty with some letters, numbers or other complex characters. Study revealed that for some subjects there were a few symbols, only a few in total number, where the subject had difficulty in accurately perceiving the tactually conveyed symbol. When the subject was prompted just prior to delivery of the difficult letter, number of complex character, the subject was then quickly placed on notice that the next character would be one of these few. This type of prompting substantially increased both speed of delivery of messages as well as accuracy. As noted above, the use of a prompter is also ideal for circumstances where the subject wearer is to be notified that there will be a change in the message. For instance, switching from letters to numbers or to complex characters that have been encoded with alternative meanings. Additionally, relatively simple changes in state are communicated quickly, such as distinguishing a.m. from p.m. when receiving a time message.

The foregoing description is considered as illustrative only of the principles of the invention, and since numerous modifications and changes will readily occur to those skilled in the art, it is not desire to limit the invention to the exact construction and operation shown and described. Accordingly, all suitable modifications and equivalents may be resorted to, falling within the scope of the present invention.

I claim:

1. A tactile communications device, worn by a human, for receiving and converting a communications data stream into a message cognitively perceptible to the human, the device comprising:
    (a) a housing including a face surface have a substantially two dimensional surface abuttably positionable over a surface of the wearer suitable to sense to tactual stimulation, the face surface including a plurality of apertures, the apertures disposed in a pattern over the face surface of the housing;
    (b) an electrical power source mountable within the housing;
    (c) a tactile stimulator array mountable within the housing having a plurality of vibromechanical stimulators positionable over the plurality of apertures and having each vibromechanical stimulator associated with one of the apertures, the vibromechanical stimulators having a tactile effector suitable for protruding through the associated aperture and impinging the surface of the wearer when the vibromechanical stimulator is electrically energized, each vibromechanical stimulator being electrically connected to the electrical power source; and
    (d) control means, electrically connected to the electrical power source and the tactile stimulator array, for independently and sequentially controlling each vibromechanical stimulator stimulate, using one vibromechanical stimulator at a time, to tactually stimulate the surface of the wearer in a symbol pattern equivalent to the received communications data stream;
    so that the received communications data stream is converted to a tactile symbol pattern on the surface of the wearer that is a cognitively recognizable message equivalent to the received communications data stream.

2. The tactile communications device of claim 1 in which the control means comprises a receiving means for electronically receiving a communications data stream.

3. The tactile communications device of claim 2 in which the receiving means comprises a radio receiver.

4. The tactile communications device of claim 2 in which the receiving means comprises an ultrasonic receiver.

5. The tactile communications device of claim 2 in which the receiving means comprises an infrared receiver.

6. The tactile communications device of claim 2 in which the receiving means comprises an interface suitable for inputting a communications data stream from a computer.

7. The tactile communications device of claim 1 further comprising a timekeeping module suitable for inputting a date and time communications data stream to the control means.

8. The tactile communications device of claim 2 in which the control means comprises a pattern storage means for storing symbol pattern data.

9. The tactile communications device of claim 2 in which the receiving means comprises a data input module for inputting programming and symbol pattern data.

10. A tactile communications device, worn by a human, for receiving and converting a communications data stream into a message cognitively perceptible to the human, the device comprising:
    (a) a housing including a face surface have a substantially two dimensional surface abuttably positionable over a surface of the wearer suitable to sense to tactual stimulation, the face surface including a plurality of apertures, the apertures disposed in a pattern over the face surface of the housing;
    (b) an electrical power source mountable within the housing;
    (c) a tactile stimulator array mountable within the housing having a plurality of vibromechanical stimulators positionable over the plurality of apertures and having each vibromechanical stimulator associated with one of the apertures, the vibromechanical stimulators having a tactile effector suitable for protruding through the associated aperture and impinging the surface of the wearer when the vibromechanical stimulator is electrically energized, each vibromechanical stimulator being electrically connected to the electrical power source; and
    (d) control means, electrically connected to the electrical power source and the tactile stimulator array, for independently and sequentially controlling each vibromechanical stimulator, the control means including:
        (d1) receiving means for electronically receiving a sequence of symbols in a digital communications data stream;
        (d2) analog pattern storage means for storing a set of analog symbols as a pattern sequence of turning on and off at least one vibromechanical stimulator of the plurality of vibromechanical stimulators corresponding to each analog symbol stored; and
        (d3) conversions means for converting the received sequence of symbols in the digital communications data stream into an analog symbol data stream according to the corresponding analog symbol pattern;
    wherein for each symbol within the analog data stream, beginning with the first symbol, the corresponding analog symbol pattern is used to turn on and off a sequence of vibromechanical stimulators, one vibromechanical stimulator at a time, following the pattern sequence for each symbol converted from the digital communications data stream so that the received digital communications data stream is converted to a tactile pattern on the surface of the wearer that is a cognitively recognizable message equivalent to the received digital communications data stream.

11. The device of claim 10 in which the housing is attachable to an appendage of the human.

12. The device of claim 10 in which the housing is attachable to a surface suitable for gripping by the human.

13. The device of claim 10 in which the housing is abuttably positionable over a suitably tactile sensitive mucus membrane of the human.

14. The device of claim 10 in which the plurality of vibromechanical stimulators comprises a plurality of electromechanical solenoids.

15. The device of claim 10 in which the plurality of vibromechanical stimulators comprises a plurality of rods of piezoelectric material.

16. The device of claim 10 in which the plurality of vibromechanical stimulators comprises a plurality of rods of bimorphic ceramic material.

17. The device of claim 10 in which the plurality of vibromechanical stimulators comprises at least 18 vibromechanical stimulators.

18. A tactile communications method for receiving and converting a communications data stream into a message tactually perceptible to a human, the method comprising the steps of:
   (a) attaching a housing to the human, the housing including an electrical power source;
   (b) mounting a tactile stimulator array within the attachment housing having a plurality of electromechanical vibromechanical stimulators in a substantially two dimensional array;
   (c) positioning the tactile stimulator array abuttably over a surface area of the skin of the human;
   (d) connecting the plurality of vibromechanical stimulators electrically to the electrical power source; and
   (e) providing a control means, electrically connected to the electrical power source and the tactile stimulator array, for independently and sequentially controlling each vibromechanical stimulator, the control means including the steps of:
      (e1) storing an analog pattern for each alphanumeric symbol for pattern sequencing of turning on and off at least one vibromechanical stimulator of the plurality of vibromechanical stimulators corresponding to each alphanumeric symbol stored;
      (e2) receiving electronically a digital alphanumeric data stream;
      (e3) converting the received digital alphanumeric data stream into an analog alphanumeric data stream according to the corresponding analog pattern; and
      (e4) turning on and off a sequence of vibromechanical stimulators, one vibromechanical stimulator at a time, according to the corresponding stored analog pattern for each alphanumeric datum within the analog data stream, beginning with the first alphanumeric datum;
such that the sequence of vibrating stimulators stimulating the skin tactually is perceived cognitively by the human as the communications message.

19. A method of communication having an electromechanical stimulator array abuttably positionable over the skin of a wearer, the array having a plurality of vibromechanical stimulators disposed substantially in a two dimensional configuration, for tactually conveying a communications data stream of symbols to the wearer, the tactually conveyed symbols being cognitively recognizable to the wearer, the method comprising the steps of:
   storing a set of vibromechanical stimulator sequence patterns in a memory module, each sequence pattern representing an equivalent symbol recognizable to the wearer;
   receiving a communications data stream;
   comparing the received communications data stream symbols to the set of vibromechanical stimulator sequence patterns for each symbol conveyed in the communications data stream; and
   sequentially triggering, one vibromechanical stimulator at a time, the appropriate vibromechanical stimulator sequence pattern for each symbol contained in the received communications data stream;
so that the wearer cognitively perceives a sequence of symbols representative of the received communications data stream and tactually conveyed to the wearer by vibromechanically stimulating the wearer's skin.

20. A tactile stimulating device suitable for use adjacent a suitably sensate surface of a human, the device comprising:
   a tactile stimulator array including a plurality of vibromechanical stimulators positionable proximate the suitably sensate surface, the vibromechanical stimulators having a tactile effector suitable for impinging the suitably sensate surface; and
   means for independently and sequentially controlling each vibromechanical stimulator one at a time so as to only trigger one vibromechanical stimulator at a time, sequentially following a pattern sequence of triggering one and then a next vibromechanical stimulator in the pattern, tactually stimulating the suitably sensate surface of the human.

21. The device of claim 20 further comprising means for suitably attaching the array to an appendage of the human.

22. The device of claim 20 further comprising means for suitably attaching the array to a surface suitable for grasping by the human.

23. The device of claim 20 in which the suitably sensate surface includes a suitably tactile sensitive mucus membrane of the human.

24. The device of claim 20 in which the plurality of vibromechanical stimulators comprises a plurality of electromechanical solenoids.

25. The device of claim 20 in which the plurality of vibromechanical stimulators comprises a plurality of rods of piezoelectric material.

26. The device of claim 20 in which the plurality of vibromechanical stimulators comprises a plurality of rods of bimorphic ceramic material.

27. The device of claim 20 in which the plurality of vibromechanical stimulators comprises at least 18 vibromechanical stimulators.

* * * * *

UNITED STATES PATENT AND TRADEMARK OFFICE
CERTIFICATE OF CORRECTION

PATENT NO. : 5,719,561　　　　　　　　　　　　　　　　　Page 1 of 2
DATED : February 17, 1998
INVENTOR(S) : Gilbert Rene Gonzales It is certified that error appears in the above-indentified patent and that said Letters Patent is hereby corrected as shown below:

On the face page, under Other Publications:

Line 2, delete "patters" and insert therefor --patterns--.

Col. 4, line 2, delete "Assessment" and insert therefor --Assessments--.

Col. 5, line 51, delete "evening" and insert therefor --evenly--.

Col. 5, line 64, delete "Nuziata" and insert therefor "Nunziata".

Col. 12, line 63, delete "pattern" and insert therefor --patterns".

Col. 14, line 15, delete "numeral" and insert therefor --numerals--.

Col. 15, line 10, delete "desire" and insert therefor --desired--.

UNITED STATES PATENT AND TRADEMARK OFFICE
CERTIFICATE OF CORRECTION

PATENT NO. : 5,719,561

DATED : February 17, 1998

INVENTOR(S) : Gilbert Rene Gonzales

It is certified that error appears in the above-indentified patent and that said Letters Patent is hereby corrected as shown below:

In the Claims:

Col. 15, line 20, delete "have" and insert therefor --having--.

Col. 15, line 22, delete the second occurrence of the word "to".

Col. 16, line 8, delete "have" and insert therefor --having--.

Col. 16, line 10, delete the second occurrence of the word "to".

Col. 16, line 39, delete "conversions" and insert therefor --conversion--.

Signed and Sealed this

Seventh Day of July, 1998

*Attest:*

BRUCE LEHMAN

*Attesting Officer*  *Commissioner of Patents and Trademarks*